April 6, 1965   W. R. SHAVER   3,176,629
COMPARTMENTIZER SUSPENSION AND SAFETY ARRANGEMENT
Filed June 5, 1963   7 Sheets-Sheet 1
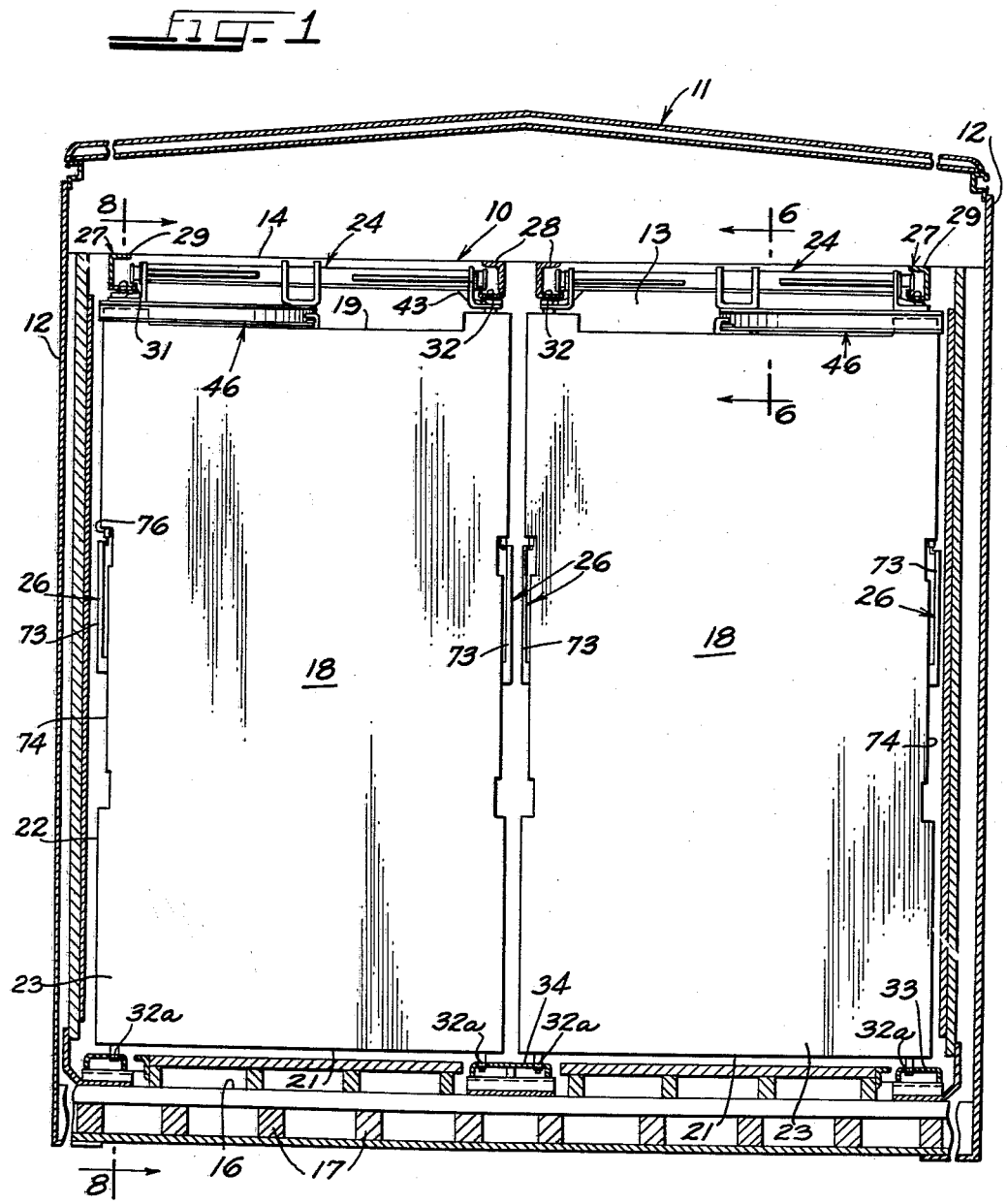
INVENTOR.
WILLIAM R. SHAVER

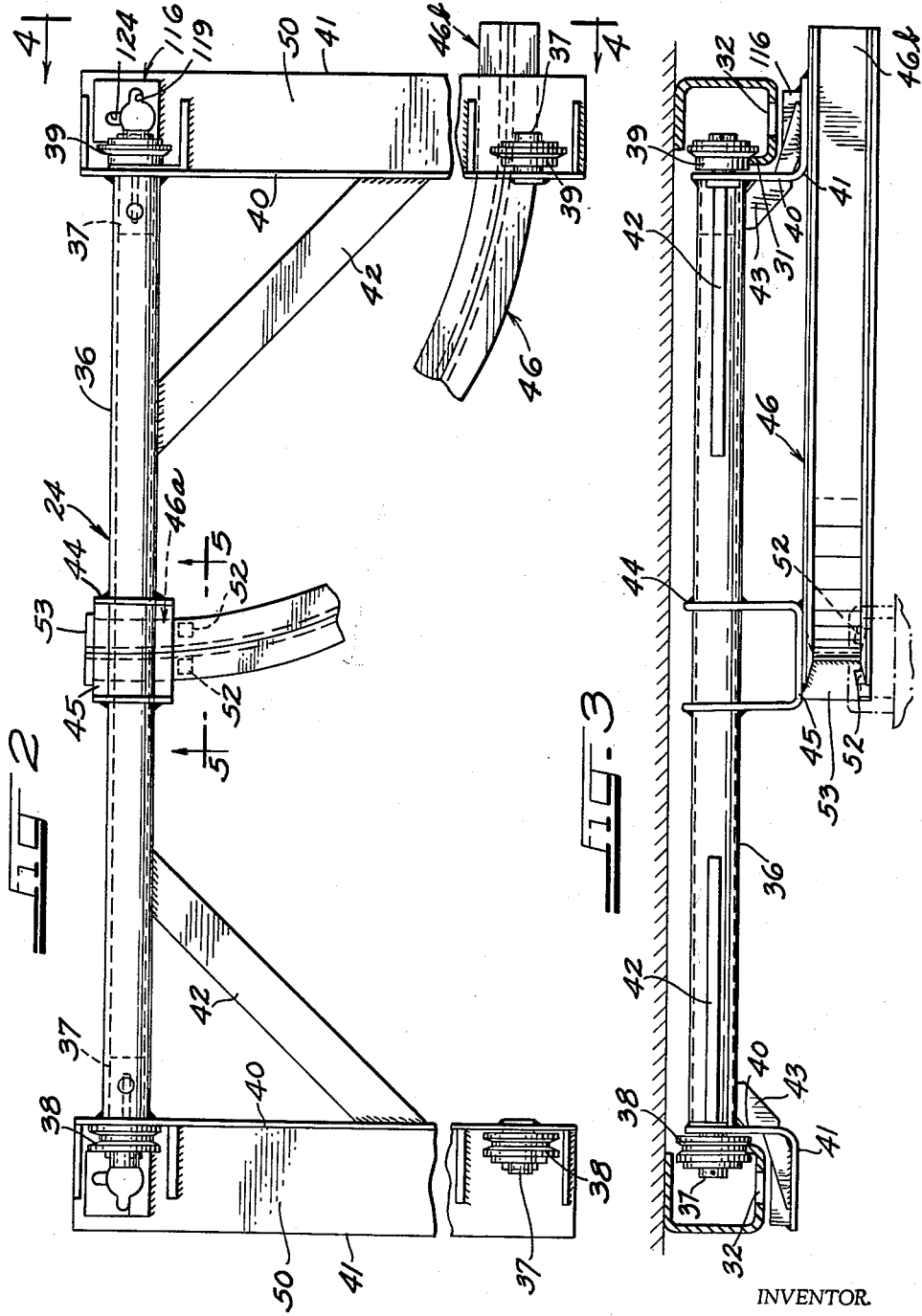

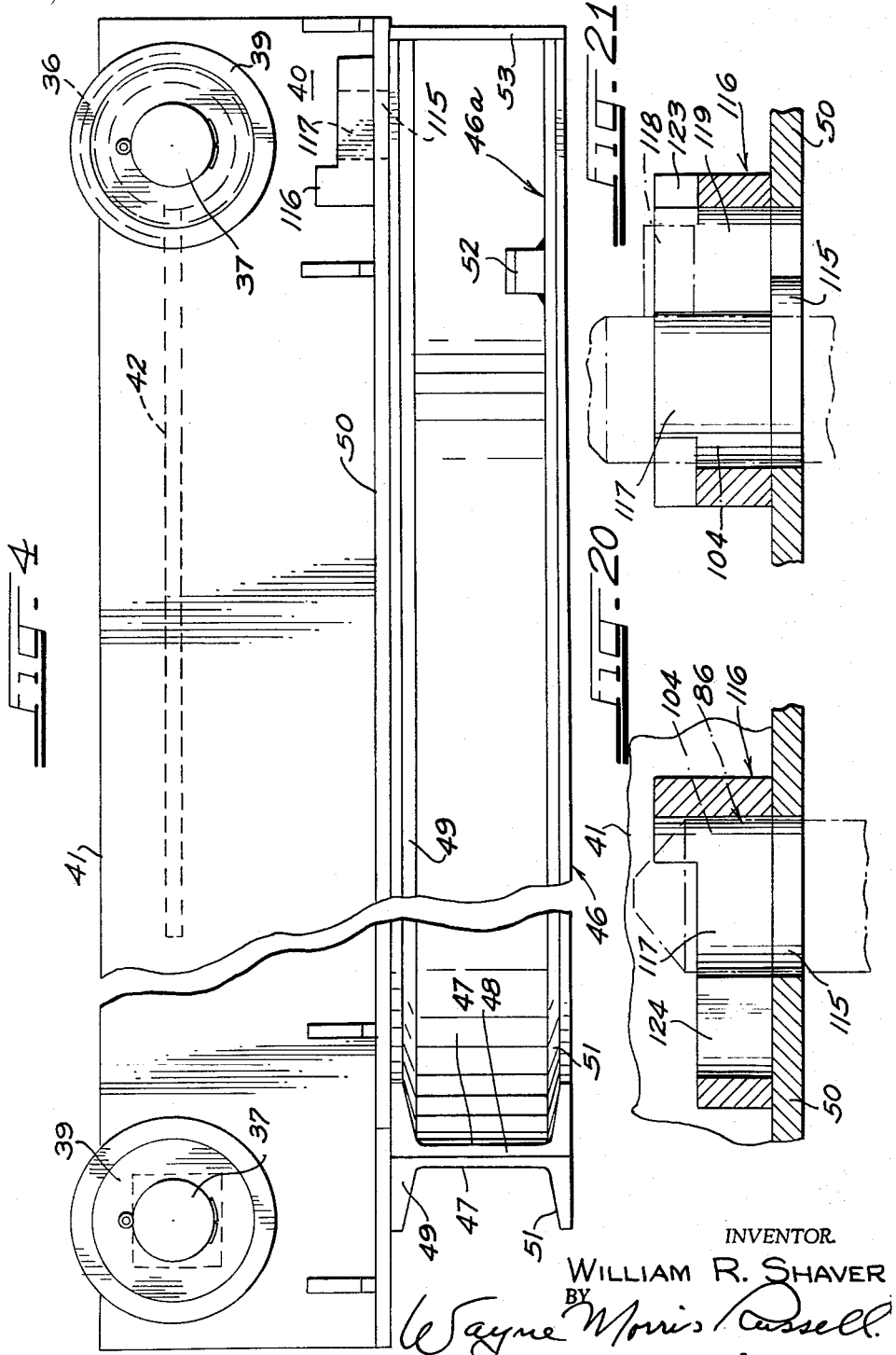

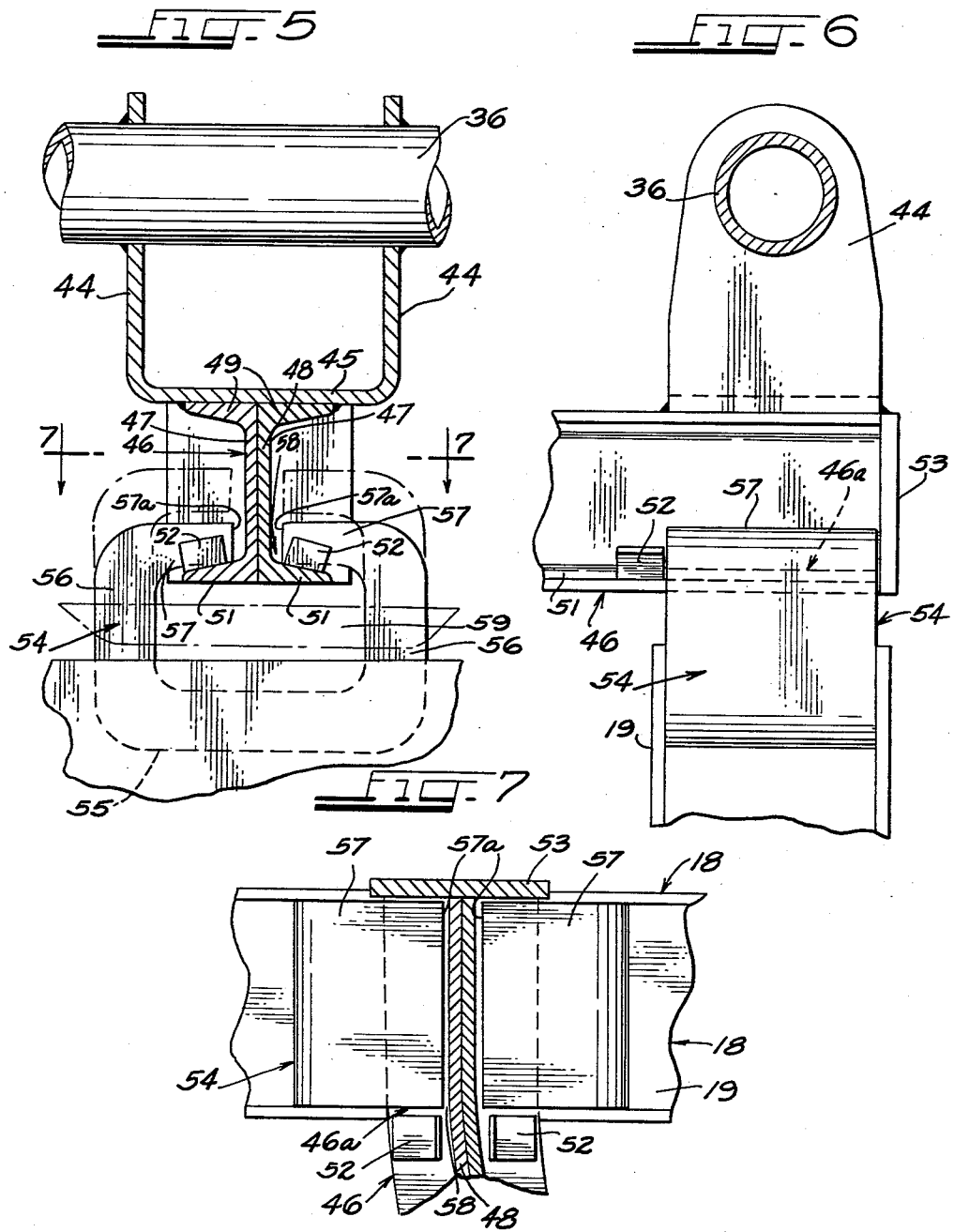

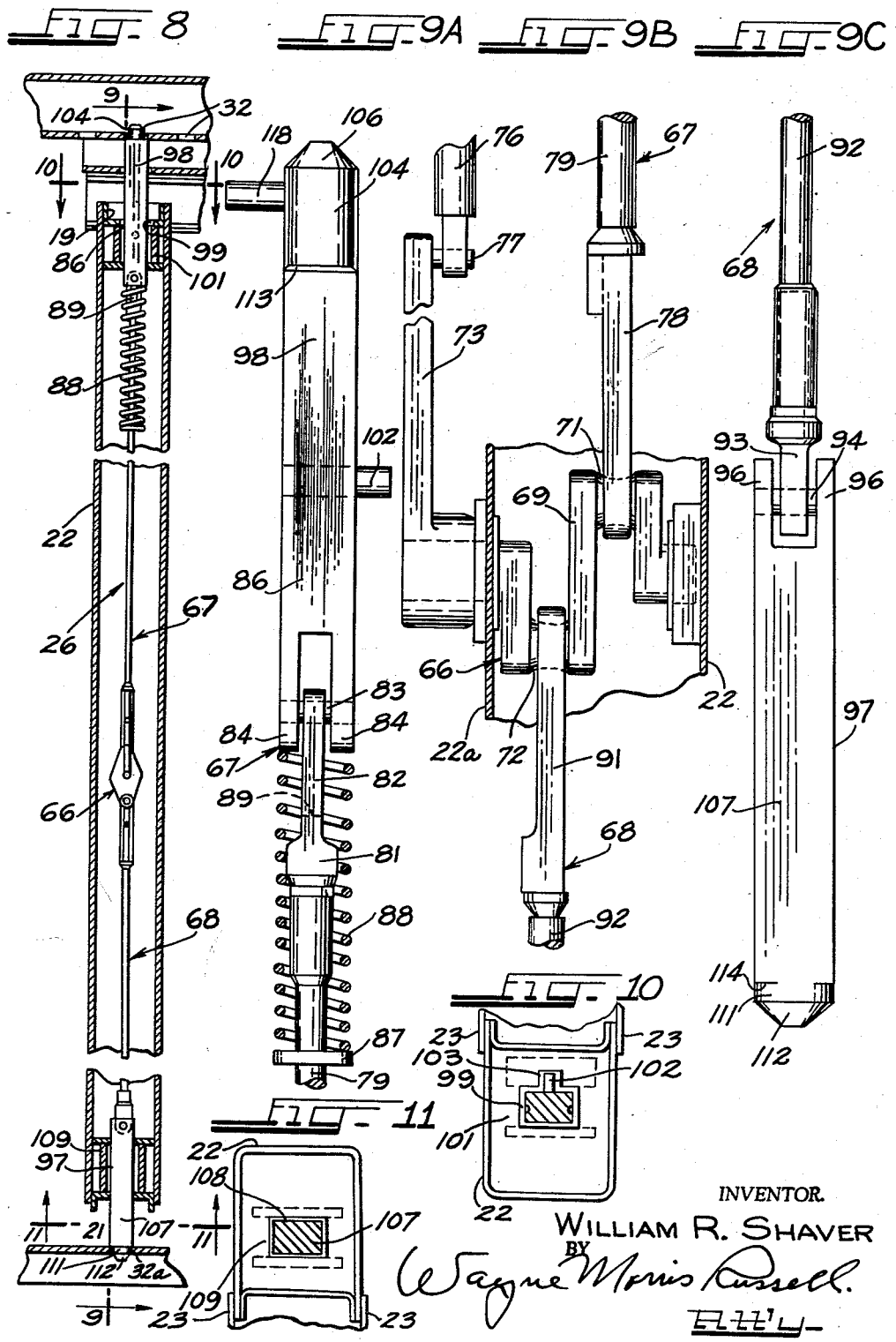

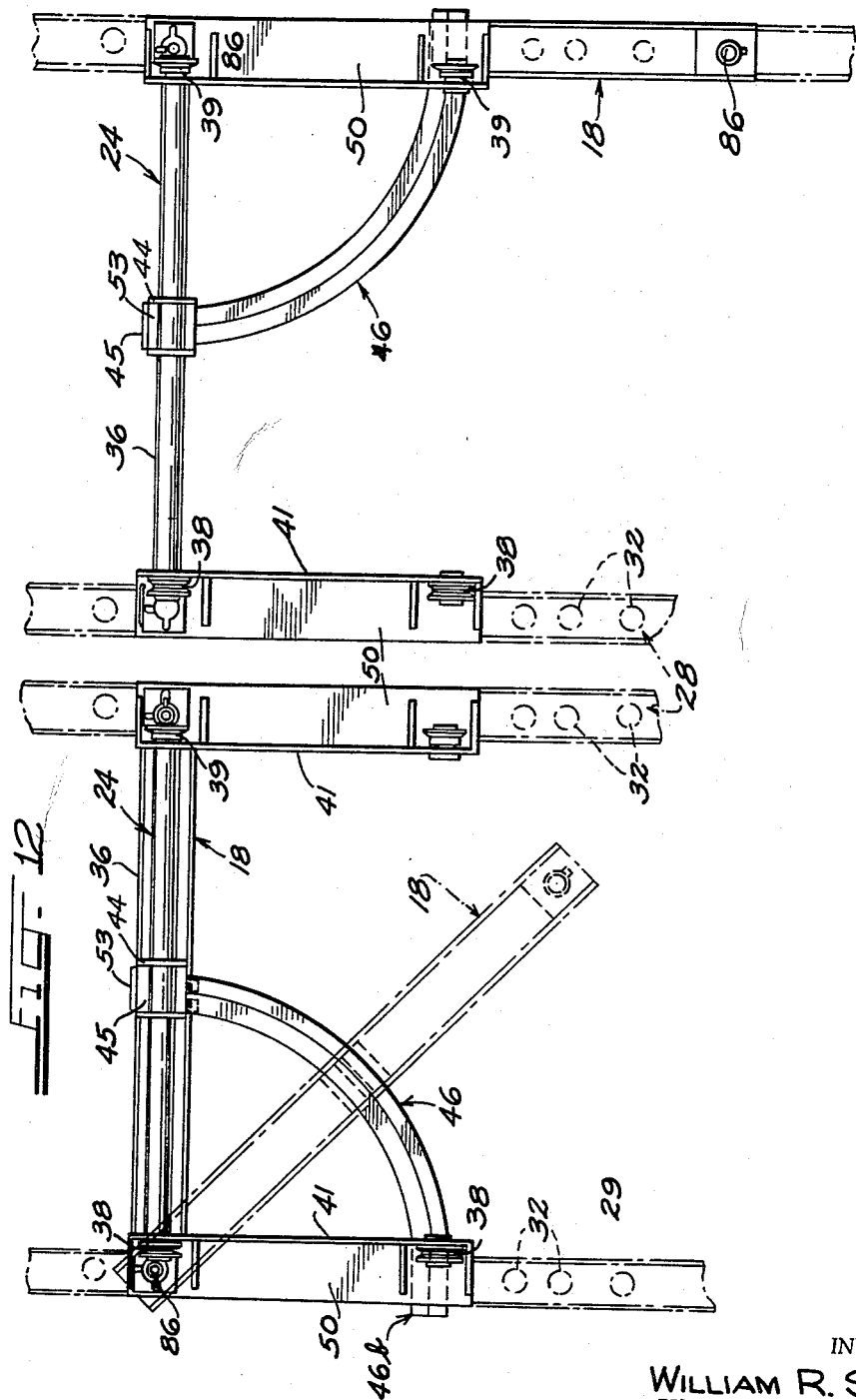

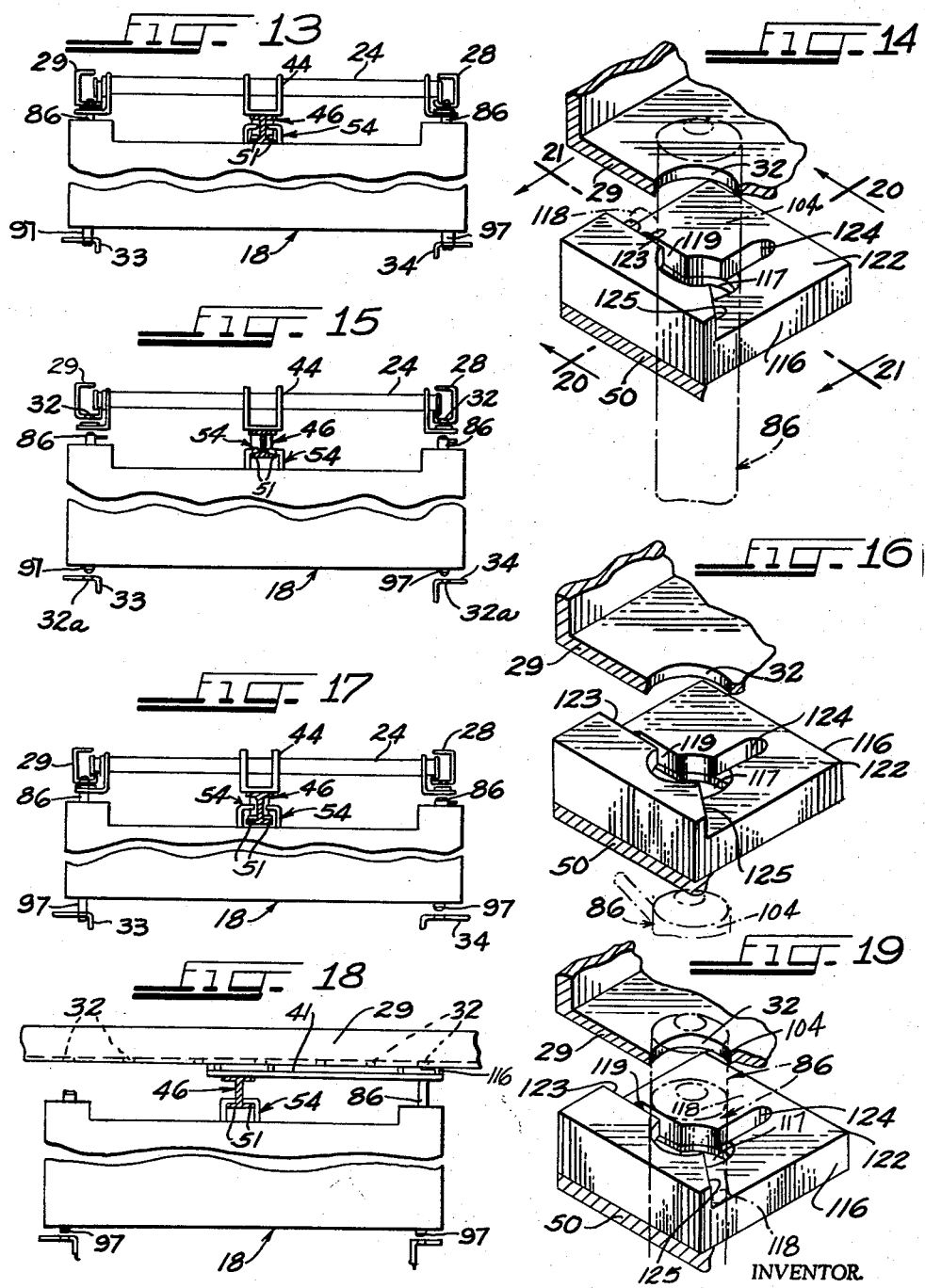

United States Patent Office 3,176,629
Patented Apr. 6, 1965

3,176,629
COMPARTMENTIZER SUSPENSION AND SAFETY ARRANGEMENT
William R. Shaver, Munster, Ind., assignor to Pullman Incorporated, Chicago, Ill., a corporation of Delaware
Filed June 5, 1963, Ser. No. 285,798
4 Claims. (Cl. 105—376)

The present invention relates to means for separating the lading within freight vehicles and more particularly to new and improved suspension and safety arrangement for lading separating means of the type having a gate which is movable lengthwise of the vehicle in a transverse attitude to divide the interior of the vehicle into compartments and which is also movable to a longitudinal attitude adjacent and parallel to the side walls of the vehicle to a stored position.

A lading separating arrangement of the above general type is disclosed in copending United States application Serial No. 251,230, filed January 14, 1963, and assigned to the assignee of the present invention. The lading separating means as disclosed in the above mentioned application comprises generally a gate which is arranged to be suspended in a transverse attitude from a lengthwise movable carriage means ridable on trackways secured adjacent to the ceiling of the vehicle. The carriage means is employed to selectively position the gate suspended therefrom lengthwise of the car to divide the interior into the desired size compartments or cubic volumes. Associated with the gate a pair of latch means which is constructed and arranged to coact with keeper means to hold and maintain the gate locked in its selected position lengthwise of the car. Moreover, upon release of one of the pair of latch means from its gate locking position, the other of the latch means in the locked position thereof is operative to detach the gate from suspension on the carriage and provide a turning axis about which the detached gate may be turned between the load dividing position and the stored position. During the turning movement of the gate about the turning axis provided by the latch means, the latter forms the sole support for the gate.

It is a principal object of the invention to provide a load dividing or separating arrangement of the above described general construction with a gate suspension and safety arrangement which serves to maintain the gate in a vertical attitude and from dropping on the flooring during lengthwise movement of the car and during turning of the gate between its operative load dividing position and stored position.

It is a further object to provide a load dividing arrangement of the above described general construction with a gate suspension and safety track arrangement having means which are constructed and arranged to coact and preclude the gate from substantial tilting out of a vertical plane.

Further objects and features will hereinafter appear.

In the drawings:

FIG. 1 is a diagrammatic view in elevation of a railway car showing a load dividing arrangement embodying the present invention;

FIG. 2 is a top plan view of the trolley carriage employed to move the gates lengthwise of the car;

FIG. 3 is a front elevational view of the trolley carriage;

FIG. 4 is a side elevational view of the trolley carriage taken generally along the lines 4—4 of FIG. 2;

FIG. 5 is a cross sectional view taken generally along the lines 5—5 of FIG. 2 showing the suspending section formed on the safety guard and the gate hanger suspended, the suspending section and showing in position of the hanger relative to the suspending section in the locked position of the gate;

FIG. 6 is a cross sectional view taken substantially along the lines 6—6 of FIG. 1;

FIG. 7 is a cross sectional view taken substantially along the lines 7—7 of FIG. 5;

FIG. 8 is a cross sectional view of the latching arrangement taken generally along the lines 8—8 of FIG. 1;

FIGS. 9a, b and c taken together show a front elevational view of the latching arrangement;

FIG. 10 is a cross sectional view taken substantially along the lines 10—10 of FIG. 8;

FIG. 11 is a cross sectional view taken substantially along the lines 11—11 of FIG. 8;

FIG. 12 is a top plan view of the gate arrangement illustrated in FIG. 1 but showing the left gate in a position intermediate an operative load dividing position and a position parallel to the longitudinal axis of the car and the right gate in a stored position parallel to the longitudinal axis of the car;

FIG. 13 is a schematic illustration of the load dividing arrangement showing the relative positions of the components thereof when the gate is in a locked load dividing position;

FIG. 14 is a perspective view of the guide block showing the relative position of the locking spud in phantom when the latching means is in the locked position shown in FIG. 13;

FIG. 15 is similar to FIG. 13 but showing the relative positions of the components in the unlocked position wherein the trolley carriage and the gate suspended therefrom are movable lengthwise of the car;

FIG. 16 is a perspective view similar to FIG. 14 but showing in phantom lines the position of the latching spuds in the unlocked position thereof;

FIG. 17 is a schematic view similar to FIGS. 13 and 15 but showing the relative positions of the components when the latching spuds are employed to turn the gate between its load dividing position and its position parallel to the longitudinal axis of the car;

FIG. 18 is a schematic view taken parallel to the longitudinal axis of the car and showing the relative positions of the components when the gate is in a stored position adjacent a side wall of the car;

FIG. 19 is a perspective view similar to FIGS. 14 and 16 but showing in phantom the position of the spud latching device when the gate is in the stored position illustrated in FIG. 18;

FIG. 20 is a cross sectional view of the guide block taken substantially along the lines 20—20 of FIG. 14; and FIG. 21 is a cross sectional view of the guide arrangement taken generally along the lines 21—21 of FIG. 14.

Referring now to the figures the load separating or partitioning arrangement 10 of the present invention is illustrated embodied in a railway freight vehicle 11 which may be a conventional box car including side walls 12, end walls 13, a ceiling 14 and a floor 16 of which the latter is supported on the longitudinally extending stringers 17 in a more or less conventional manner.

In the form shown the partitioning arrangement 10 includes generally a pair of side-by-side partitioning members 18 arranged so that when positioned transversely of the car form a wall or barrier extending between the side walls 12. The partitioning or gate members 18 are each of similar structure and are preferably of lightweight construction capable of withstanding the stresses usually associated with compartmentized types of gate construction.

In the preferred form shown (FIGS. 5, 6, 8, 10 and 11) the gate 18 employs a core stabilized construction including generally a shell form by channel members defining the top 19, bottom 21, and sides 22. Fixed across the channel flanges are facing plates 23 secured thereto by welding. Disposed between the facing plates 23 and bonded thereto may be a core of honeycomb material (not shown) which may be a cardboard or other suitable resilient material. The honeycomb core serves to distribute the sheer flow of the bending forces applied on the surface of the face plates 23 along the respective mating and bonded surfaces and transfers these bending forces to the channel members 19, 21 and 22 such that substantially all of the sheer stress is assumed by the top, bottom and side channels 19, 21 and 22. For a more detail description of the gate construction reference is made to U.S. patent application Serial No. 148,529, filed October 30, 1961, assigned to the assignee of the present invention.

The gates 18 are suspended or supported by way of the respective transversely extending supports or carriages 24 which are each movable lengthwise of the car so as to selectively position the respective gates 18 longitudinally of the car into a load dividing position. When so positioned latching means 26 provided in the gates 18 coact with keeper means 27 fastened to the ceiling and floor of the car to lock the gates in the selective position.

In accordance with the present invention when it is desired to store the gates 18 along the side walls 12 parallel to the longitudinal axis of the car, the gates 18 are detachably secured to the carriages 24 and the latching means 26 are employed as a pivot axis for swinging the gates 18 transversely of the car as more fully to be explained hereafter.

As shown, track means movably supporting the carriage for lengthwise movement is incorporated in the keeper means 27 secured to the ceiling 14 as by bolts. The ceiling keeper means 27 extend longitudinally of the car including one set of keepers including an inner keeper 28 and an outer keeper 29 for each of the gates 18. Each of the keepers 28 and 29 are in the form of channels of substantially C-section and have an upwardly projecting vertical flange providing a rail 31. The channels of each of the pair of keepers are arranged so that the rails 31 are transversely spaced in opposing relationship.

Formed in the ceiling keepers 28 and 29 are lengthwise spaced openings 32 which coact with the gate latching means 26 to hold the gates 18 locked. The openings 32 are transversely aligned with the opposing keepers 28 and 29 of each set of keeper means 27 so that when the latching means 26 on each side of the gates 18 are disposed therein, the gates are held locked in a plane substantially transverse to the side walls 12 as shown in FIG. 1. Secured to the floor 16 of the car are outer floor keepers 33 and an intermediate keeper 34. The outer floor keepers 33 are located directly below and in alignment with the outer ceiling keepers 29 and include openings 32a aligned with the openings 32 of the respective outer ceiling keepers 29. The intermediate keeper 34 as shown includes two rows of openings 32a in alignment with the respective ones of the openings 32 in each of the two inner ceiling keepers 28.

The trolley carriages 24 supporting the gates 18 are each of identical structure so that only one need be described, it being understood that the other carriage is of substantially identical structure. The trolley carriage 24 (FIGS. 2, 3 and 4) includes a transversely extending hollow shaft 36 which extends between one set of the inner and outer ceiling keepers 28 and 29. Rotatably supported on stub shafts 37 fixedly secured to the ends of the hollow shaft 36 and rideable on the rails 31 are roller members 38 and 39. One of the roller members 38 may be of the dual flange type and the other roller 39 of a single flange type. With this arrangement of the dual and single flanged wheel, the assembly of the carriage to the rail structure is facilitated.

Fixed adjacent each of the ends of the hollow shaft 36 are vertical webs 40 of angle members 41 extending longitudinally of the car and parallel to the floor 16. The angle members 40 carry at the ends thereof stub shafts 37 on which there are turnably mounted flanged wheels 38 and 39 substantially identical to the wheels or roller supported on the respective ends of the hollow shaft 36.

Extending between the hollow shaft 36 and angle members 41 are horizontal bracing members 42. Reinforcing may also be provided by way of gusset plates 43 at the juncture of the vertical leg 40 with the hollow shaft 36.

Disposed intermediate the ends of the hollow shaft 36 and fixed thereto as by welding is a substantially U-shaped hanger bracket 44. Fixed to the underside of the bight 45 is one end portion of a combination gate suspension and safety member 46 which serves to suspend the gate 18 from the carriage 24 and prevents the gate 18 from falling during lengthwise movement with the carriage 24 and when the gate 18 is turned about the pivot axis provided by the latching means 26.

As shown in particular in FIGS. 2-6 the combination gate suspension and safety member 46 is formed from a pair of channel members 47 secured back to back to provide a substantially vertical wall 48 from the upper ends of each of which there projects outwardly extending upper flanges 49 and from the bottom edges of which there project outwardly extending horizontal lower flanges 51. The safety member 46 is curved along the radius of an arc having a center located at the center of a latch accommodating opening 115 formed in the horizontal flange of the outer angle members 40 of the carriage 24.

The portion of the safety member 46 underlying the horizontal flange is fixed thereto as by welding. It is to be observed that the safety member 46 is formed of a length such that the end portion 46b extends beyond the outer edge of the horizontal flange 41.

Defining a suspension section 46a from which the gate 18 is suspended during lengthwise movement of the carriage 24, are stop blockers 52 fixed as by welding to the lower flanges 51 on opposite sides of the vertical wall 48 and lengthwise spaced from a vertical stop plate 53 fixed across the rear end of the bight 45 and the safety member 46 as shown in FIGS. 5-7.

Fixed to the upper or top channel 19 of the gate 18 is a gate hanger 54 which may be a casting of substantially C-shaped section including a base 55, upright arms 56 and inwardly projecting horizontal arms 57 of which the free ends 57a are in spaced relationship to provide an open ended slot 58 of somewhat greater width than the thickness of the vertical wall 48. The inner walls of the upright arms 56, the horizontal arms 57 and the base 55, are arranged to define an open ended chamber 59 accommodating the width and length of the safety member 16 to permit elevation of the gate hanger 45 from suspending engagement with the lower flanges 51 as illustrated in the phantom line position shown in FIG. 5.

As shown in particular in FIGS. 8, 9a, 9b and 9c the latching means 26 are disposed in an enclosure provided in the side channels 22 of the gate 18 and each include generally a latch actuating mechanism 66, an upper spud latching assembly 67 and a lower spud latching assembly 68. The latch actuating mechanism (FIG. 9b) includes a crankshaft 69 journaled at one of its ends in the vertical web of the side channel member 22 and at its other end in an enclosure plate 22a. Turnably connected to one of the crank arms 71 is the upper spud assembly 67 and to the other crank arm 72 there is connected the lower spud assembly 68.

The crank shaft 69 is turned by way of a handle 73 connected to the crank shaft 69 for turning movement therewith. As shown, in FIG. 1 the handle 73 is disposed within a cut-out portion 74 provided along the edge of side channels. The handle 74 may be formed from a casting or sheet metal. For holding the handle 73 in the locked or latched position there is provided a spring-depressed plunger 76 having a forked end which engages an inwardly projecting pin 77 fixed to the end of the handle as shown in FIG. 9b.

The upper spud linkage assembly 67 includes a connecting rod member 78 turnably connected to the crank shaft arm 71 at one end and at its other end is force-fitted into one end of a tubular rod 79. Fixed to the other end of the tubular rod 79 is a spud connecting member 81 having an elongated slotted end 82 which receives a pin 83 supported by the clevis arms 84 provided on the lower end of the upper spud 86. Disposed between the bottom of the upper spud 86 and a washer 87 fixed to the rod 79 is a biasing spring 88 which serves to urge the locking spud upwardly in the slot 89 of the connecting member 81.

The lower spud linkage assembly 68 includes a connecting member 91 having one end turnably supported on the crank shaft arm 72 and having its other end fixed to a tubular rod 92. Fixed in the other end of the tubular rod 92 is a connecting member 93 which is turnably connected to a pin 94 mounted in clevis arms 96 formed on the upper end of the lower latching spud 97.

At its lower end 98, the upper latching spud 86 is of substantially rectangular section and is guided for vertical movement in a rectangular opening 99 provided by spud guiding housing 10; fastened in the side channel 22. Projecting from the rectangular section 98 is a pin 102 which is slidably disposed within a vertical slot 103 formed along one side of the rectangular guide housing 10. The pin and slot arrangement 102 and 103 serve along with the rectangular guide opening 99 to preclude rotation or turning of the gate 88 and the latching means 26 relative to each other. The upper end 104 of the locking spud is formed with a substantially circular section and a tapered head 106 which are receivable within the upper keeper openings 32.

The lower latching spud 97 is also formed with a portion 107 of substantially rectangular section which portion is movable in a rectangular opening 108 of a guide housing 109 fastened to the lower end of the side channel 22. The lower end 111 of the spud is formed of circular section with a tapered head 112 which is receivable within the lower or floor keeper openings 32a.

In the normal locked position shown in FIG. 8 the latching spuds 86 and 97 are engaged in vertically aligned openings 32 and 32a of the upper and lower keepers. To assume the locked position, the handle 73 is moved from a normal substantially horizontal position, to a vertical position. In the locked position of the handle 73 the crank shaft 69 fixed for turning movement therewith is turned so that the upper spuds 86 and lower spuds 97 are engaged within the keeper openings 32 and 32a respective with shoulders 113 and 114 of the respective rectangular end portions 98 and 107 abutting the keepers 28, 29, 33 and 34. In this position the overall length of the lower latching spud assembly 68 connected to the crank arm 72 is such that the gate 18 is moved upwardly. Such upward movement of the gate 18 is made possible by the pin slot connection 82–83 of the upper spud 86 with the upper spud linkages 79 and 81 and the biasing spring 88 which retains the upper spud engaged in the keeper upper openings 32.

When the gate 18 is thus moved upwardly the hanger 54 affixed thereto is correspondingly moved so that the horizontal arms 57 are out of suspending engagement with the lower flanges 51 of the safety member suspension section and spaced above the stop blocks 52 as shown in the phantom line position of FIG. 5. In this connection it should be noted that only one of the latching spuds need be in the latches or locked position to raise the gate 18 out of suspending relationship with the safety member.

In the event that both of the latching devices 26 are in the unlocked position wherein the upper and lower spuds 86 and 97 are retracted out of the respective keeper openings 32 and 32a as shown in FIG. 15, the gate 18 is lowered such that the horizontal hanger arms 57 engage the horizontal flanges 51 between the stop plate 53 and stop lugs or blocks 52. In this manner the gate 18 is suspended on the carriage 24 for lengthwise movement therewith. Upon the application of a pushing force on either side of the gate 18 the horizontal arms 57 engage the opposing one of the stop plate 53 or the stop blocks 52 so that the force is transmitted to the carriage causing the latter to roll along the trackways 31. In this connection it is to be observed, that in the event that the lower edge of the gate 18 strikes an obstruction causing the gate to be raised above the stop blocks 52 or outside of the confines of the suspension section 46, the vertical wall 48 and the upper flanges 49, end lower flanges 57 limit tilting movement and the vertical movement of the gate 18 so as to prevent it from falling.

While the latch handles 73 located along the sides of the gate 18 may be employed to apply the pushing force, it is to be understood that other types of handle arrangements, such as handles fixedly secured to the side plates 23, may also be employed. In the embodiment of latch means 26 illustrated, the upper and lower spud linkages, are mounted on the crankshaft 69 such that the handle 13 fixed to the latter may be turned in either direction to release the gate 18. This construction of the latching means 26 is advantageous because it permits the handles 73 to be used on either side of the gate to apply the pushing force. When the gate 18 has been selectively positioned lengthwise of the car, the latching means 26 are restored to the locked position with the circular end 104 and 111 of the latching spuds 86 and 97 disposed in the respective keeper openings 32 and 32a.

When thus positioned the latching devices 26 along each side of the gate 18 are turned to the locked position so that the upper end latching spuds 86 and 97 are each in engagement with the respective keeper openings 32 and 32a as shown in FIG. 13. In the locked position the weight of gate 18 is supported by the latching devices 26.

To turn the gate from the operative loading dividing position of FIG. 13 to a stored position adjacent the side wall of the car as shown in FIG. 18, the latching device 26 remote from the side wall is released and the other latching device is retained in the locked position thereof. The single locked latching device 26 as heretofore mentioned maintains the gate 18 raised out of suspending engagement with the carriage 21 so that the gate is detached therefrom.

Assuming that the right gate, as shown in FIGS. 12 and 17 is turned to a stored position adjacent to the left wall of the car, the latching means 26 along the right side of the gate 18 is released and the latching means along the left side is retained in its locked or latched position. Thus the circular ends 104 and 111 of the upper and lower spuds 86 and 97 seated within the circular openings 32 and 32a are free to turn therein. In this manner the gate 18 which, as heretofore described, is fixed for turning with the spuds 86 and 97 is also rendered turnable therewith.

During turning of the gate 18, the latter remains in the raised position such that the horizontal arms 57 of the hanger 54 remains vertically spaced above the horizontal flanges 51 of the safety member 46. Also, the terminal ends 57a of the arm 57 remains out of engagement with the vertical wall 48. It should be readily apparent, therefore, that the gate is solely supported by the locked latch means 26 about which the gate 18 is being turned. However, in the event that the locked latch means is inadvertently released, the vertical wall 48 and the lower horizontal flanges are engaged by the hanger 54 so as to prevent the gate 18 from falling.

When the gate is in the stored position shown in FIG. 18 and along the right wall as viewed in FIG. 12, the locked latch means 26 may be released, whereupon the gate 18 is again suspended from the safety member by way of the hanger 54 engaging the lower horizontal flanges 51. In the stored suspended position the gate is again movable with the carriage 24 so that it may again be moved along the side wall of the car to any desired position. Should it be desired to fix the gate 18 against lengthwise movement in the stored position the latch means on both sides of the gate are positioned in the locked position so that the spuds 86 and 97 of each are seated within the keeper openings 32 and 32a.

As shown in FIGS. 14, 16, 18, 20 and 21, to prevent relative longitudinal movement of the carriage 24 and gate 18 during rotation of the latter between its position transversely of and parallel to the longitudinal axis of the car the horizontal webs 50 of the longitudinal angle members 41 are located in the path of movement of the latching device to their locked position and are formed with an opening 115 accommodating the circular ends 104 of the upper spud 86. Fixed to the upper face of the horizontal webs 50 are pivot blocks 116 having openings 117 substantially axially aligned with the horizontal web openings 115 and also accommodating the circular end of the spud 86 which is projectable therethrough for engagement within the keeper openings 32. Radially projecting from the circular spud section 104 is a locating pin 118 which is arranged so as to coact with a transversely extending slot 119 and a longitudinally extending slot 124. The transversely extending slot 119 is formed through the horizontal web 50 while the longitudinally extending slot 124 terminates at its lower end at the horizontal web 50. In the gate suspended position transversely of the car as shown in FIG. 15 wherein the latching means 26 are in released position the spuds 86 lie beneath the horizontal web 50 so that gate 18 is free to be rotated. Upon raising the gate as by moving the latching means 26 to their latched position the locating pins 118 passing through the transverse slots 115 and 119 serves to position and locate the gate 18 transversely to the longitudinal axis of the car. In the fully latched or locked position as shown in FIG. 14 the locating pins 118 lie above the top surface 122 of the guiding blocks 116.

When it is desired to turn the gate 18 from its transverse position as heretofore described wherein one of the latching devices 26 is in a released position and the other is in a latched position the locating pin 118 of the upper latched spud 86 is positioned above the surface 122 so that latching devices and gate are free to turn as shown in FIG. 14. Such turning is limited in a direction toward the side wall by way of a shoulder 123 and into alignment with the longitudinally extending slot 121. In this position the release of the latching device 26 results in the locating pin 118 passing through the longitudinal slot 127 until it engages the horizontal web 50 as shown in FIG. 20. In this manner the upper and lower latching spuds 86 and 97 are released from engagement with the keeper openings 32 while at the same time the upper spud 86 is retained within the pivot block 116 so as to preclude longitudinally movement of the gate 18 with respect to the gate. This arrangement facilitates the shifting or moving of the now longitudinally extending gate 18 lengthwise of the car when both of the latching devices are in the unlocked position.

As shown the guide block 116 is formed with a second shoulder 125 located so as to permit relative turning of the spud 86 beyond the longitudinally extending slot 124 before the locating pin 118 abuts the shoulder 125. Thus, if the gate is located adjacent the car door and it is desired to swing it outwardly of the car through the door one of the latching devices 26 is released and the other locked as explained heretofore in connection with the moving of the gate between its transverse and longitudinal positions. Thus the locating pin 118 on the locked upper spud 86 is elevated upwardly above the top surface 122 of the guide block 116 whereupon the latching device 26 serves again as a pintle and the gate 18 is swung beyond the safety extension section 46b outwardly of the car door until swinging movement is limited by abutment of the locating pin 118 with the stop 125.

What is claimed is:

1. A load dividing arrangement for a freight vehicle having a floor, a ceiling, and opposing side walls, said load dividing arrangement comprising gate means, longitudinally extending and transversely spaced track means mounted on said ceiling, carriage means extending transversely to said side walls and including means slidably supported by said track means so that said carriage means is movable lengthwise of said vehicle, latch means along the side of said gate means movable between gate locking and gate unlocked positions, keeper means on said ceiling and said floor for coacting with said latch means in the locked position thereof, a substantially semi-circular arcuate means affixed to said carriage means having one end thereof underlying said transverse carriage means and the other end terminating adjacent to one of said side walls, said arcuate means including a vertical wall and horizontal flanges extending from each side of said vertical wall, hanger means affixed to the upper end of said gate means, and hanger means including a pair of horizontal arms having terminal ends spaced from and disposed on either side of said vertical wall, said horizontal hanger arms overlying and being suspendingly engaged from respective ones of said horizontal flanges, said latch means and keeper means including means operative to raise said horizontal hanger arms from suspending engagement with said horizontal flanges to detach said gate means from said carriage means and to provide a turning axis about which said gate means is turnable in the direction of curvature of said arcuate means between a position transverse to said side walls and a position parallel to said side walls.

2. The invention as defined in claim 1 wherein said floor and ceiling keeper means each includes lengthwise spaced and longitudinally and transversely aligned circular openings, and said latch means each includes circular spud means insertable therein in the locked position of said latch means.

3. The invention as defined in claim 2 wherein said arcuate means is curved about a center substantially concentric with said spuds of said latch means adjacent the side wall of said vehicle whereby said arcuate means provides a safety member with prevents said gate means from falling during turning of said gate means between said aforementioned positions.

4. The invention defined in claim 3 including stop means on said end of said arcuate means fixed to said transversely extending carriage means for limiting lengthwise relative movement of said hanger means along said arcuate means when said horizontal arms are suspendingly engaged with said horizontal flanges.

References Cited by the Examiner
UNITED STATES PATENTS 2,009,895 7/35 Madden et al. _____ 105—376
3,005,419 10/61 Loomis et al. _____ 105—376

ARTHUR L. LA POINT, *Primary Examiner.*